March 3, 1970  H. GEISTHOFF ET AL  3,498,082
PROTECTIVE DEVICE FOR A UNIVERSAL JOINT
Filed Nov. 12, 1968
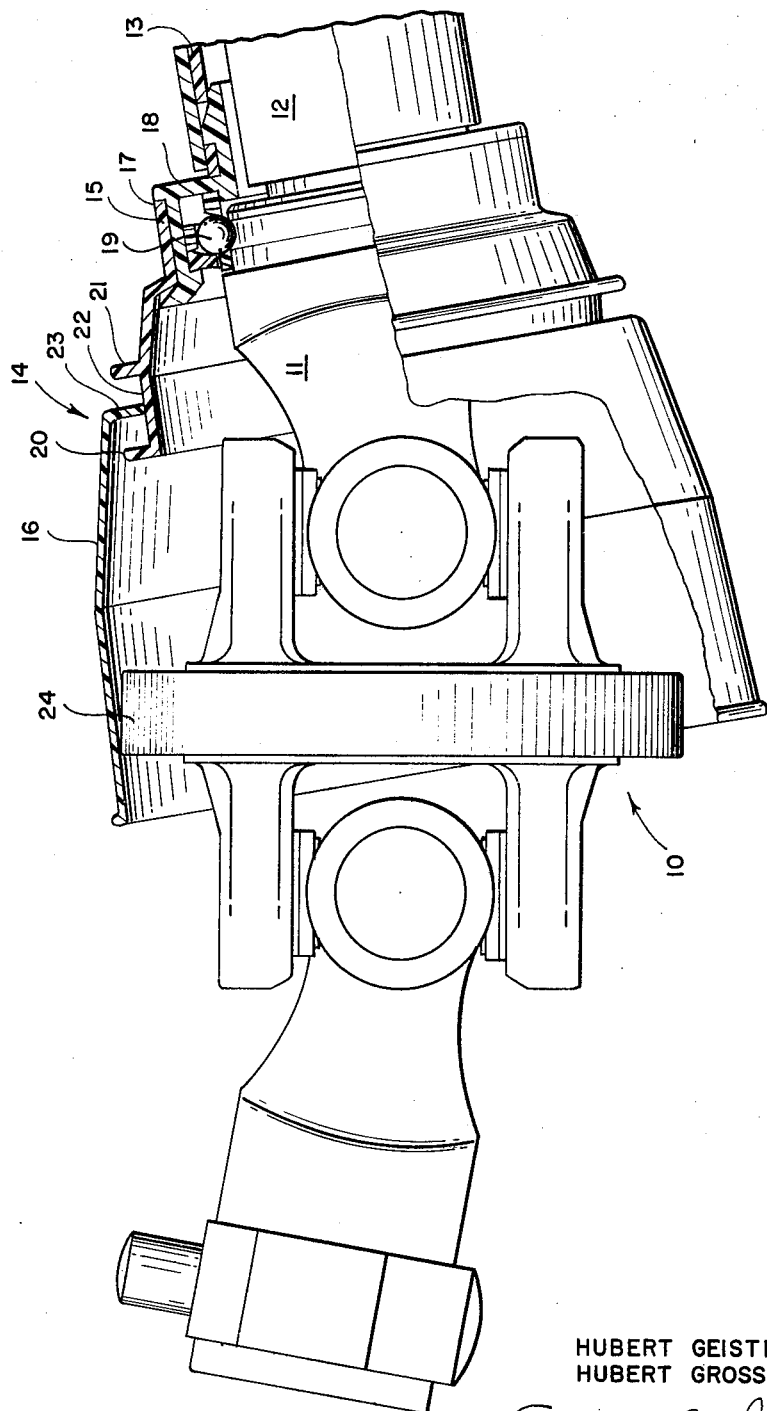
INVENTORS
HUBERT GEISTHOFF
HUBERT GROSSE-ENTRUP
BY Edmund M. Jaskiewicz
ATTORNEY United States Patent Office 3,498,082
Patented Mar. 3, 1970

3,498,082
PROTECTIVE DEVICE FOR A UNIVERSAL JOINT
Hubert Geisthoff, Donrath, and Hubert Grosse-Entrup, Albach Post Franzhauschen, Germany, assignors to Jean Wallerscheid, K.G., Siegburg-Lohmar, Germany, a corporation of Germany
Filed Nov. 12, 1968, Ser. No. 775,058
Claims priority, application Germany, Nov. 22, 1967, 1,625,845
Int. Cl. F16d 3/84
U.S. Cl. 64—32                     5 Claims

ABSTRACT OF THE DISCLOSURE

A protective device is mounted on a stationary tube which surrounds the universal joint shaft on one side of the universal joint. The protective device consists of a resilient funnel-shaped member having one end fastened to the tube with there being a peripheral groove around the free end of this member. A second funnel-shaped member has its inner end bent inwardly so as to be received within the groove for axial movement therein. The second member extends over the universal joint and is made of a substance which can withstand wear by friction.

---

The present invention relates to protective devices for agricultural machinery, more particularly, to a protective device for a universal joint.

Universal joints are commonly used in the drive shafts in many forms of machinery. Many agricultural machines have been equipped with such universal drive shafts. Because of the construction and operation of such agricultural machines these drive shafts are exposed and present a constant source of danger to personnel attending or operating the machinery. As a result, many protective arrangements have been proposed for both the drive shaft and the universal joint.

An early form of such a protective device comprised two members mounted on the universal joint shafts on both sides of the universal joint. The members overlapped each other to enclose the universal joint itself. However, these protective devices are expensive to manufacture and present problems in assembling or disassembling the shafts from the joint.

In another form of universal joint guard a first funnel-shaped member had one end connected to a rigid or flexible tube which extended over the universal joint shaft on one side of the universal joint. A second funnel-shaped member was rigidly connected, such as by riveting or welding, to the first funnel-shaped member and extended over the universal joint. This particular arrangement was not satisfactory since the universal joint could not bend to the wide angles encountered in the operation of wide-angle universal joints. In addition, the large diameter of the open end of the second funnel-shaped member necessary to permit a greater bending angle was unsatisfactory because of the limited space available in agricultural machinery for such protective devices.

It is therefore the principal object of the present invention to provide a novel and improved protective device for universal joints.

It is another object of the present invention to provide a protective device for universal joints which permits the bending of the joint to wide angles but does not result in any damage to the protection device.

It is a further object of the present invention to provide a protective device for universal joints which is of simple construction, economical to manufacture and can easily be installed or removed from a universal joint.

The protective device according to the present invention is mounted on a stationary protective tube which surrounds the universal joint shaft on one side of the universal joint. The protective device essentially comprises a first funnel-shaped member of a resilient material with one end fastened to the stationary tube and the other or free end extending outwardly of the tube. There is a peripheral groove around the free end of the first funnel-shaped member. A second-funnel shaped member has one end received within the peripheral groove for axial movement therein and extends over the universal joint. The second funnel-shaped member is formed of a material which can withstand wear by friction.

Other objects and advantages of the present invention will be apparent upon reference to the accompanying description when taken in conjunction with the following drawing which shows a side view of a universal joint incorporating the protective device of the present invention with the protective device being shown in section.

With reference to the drawing, a specific embodiment of the present invention will be described in detail.

In the drawing, a double universal joint is indicated at 10 with one of its yokes 11 being mounted on the drive shaft 12 which is surrounded by a stationary protective tube 13 which may be rigid or flexible. The protective device of the present invention is indicated generally at 14 and comprises a first funnel-shaped member 15 and a second funnel-shaped member 16.

Funnel-shaped member 15 is resilient and has its inner end 17 connected to the end of the stationary protective tube 13 through a ring 18 which is rotatably supported by ball bearings 19 upon a portion of the yoke in a manner known in the art. The funnel-shaped member 15 extends outwardly of the stationary tube and this free end is provided with a pair of spaced parallel ribs 20 and 21 which between them define a peripheral groove 22.

The second funnel-shaped member 16 has an internal flange 23 formed on its inner end with the inner edge of this flange being received within the peripheral groove 22 for axial movement therein. The bottom of peripheral groove 22 is substantially straight in an axial direction with respect to shaft 12.

The relative axial movement between the funnel-shaped elements 15 and 16 provides an extra flexible connection which enables the funnel-shaped member 16 to follow readily wide-angle bends in the universal joint. The funnel-shaped member 16 is made of a material which is highly resistant to frictional wear so that when the universal joint is subjected to wide-angle bends occasional contact between the inner surface of funnel-shaped member 16 and flange 24 of the joint does not damage or destroy the funnel-shaped member. The movable connection between the two funnel-shaped members 15 and 16 is such that when the outer funnel-shaped member 16 should contact a portion of the rotating joint this funnel member will have a differential movement between the shaft and the stationary protective tube. As a result, the contact area between the funnel-shaped member 16 and the joint is continuously changing so that no one area of the member is subjected to undue wear. Further, by employing a wear-resistant material for this funnel-shaped member the funnel-shaped member will have a long operating life.

The relatively small funnel-shaped member 15 is made of a resilient material and hence can be readily assembled and mounted onto the stationary tube 13 and the funnel-shaped member 16.

Thus it can be seen that the present invention has disclosed a protective device for universal joints which essentially comprises a pair of articulated funnel-shaped members. The funnel-shaped member which extends over the universal joint can readily follow the bending of the joint to its maximum angle which may range to 70-90° without any risk of damage to the first funnel-shaped member which is mounted on the stationary protective tube surrounding the drive shaft. Further, the maximum outer diameter of the funnel-shaped members is well within the limits of the free space available around the take-off shaft bend. The first or smaller funnel-shaped member is made of a resilient material so as to facilitate assembling or disassembling the protective device. This resiliency of the smaller funnel-shaped member together with the axial or articulated mounting of the second funnel-shaped member on this first funnel-shaped member permits the movement of the universal joint through a wide range of angular bends without subjecting the protective device to damage or wear.

What is claimed is:

1. In combination, a universal joint shaft having a stationary tube surrounding the shaft on one side of the universal joint, a first funnel-shaped member having one end fastened to said stationary tube and its free end extending outwardly of the tube, means on said first funnel-shaped member for defining a peripheral groove around the free end thereof, and a second funnel-shaped member having one end received within said groove for axial movement therein and extending over the universal joint.

2. In combination as claimed in claim 1 with said second funnel-shaped member being of a material which can withstand wear by friction.

3. In combination as claimed in claim 1 with one end of the second funnel-shaped member having an internal flange thereon with the inner end of said flange being received within said peripheral groove.

4. In combination as claimed in claim 1 with the bottom surface of said peripheral groove being substantially straight in an axial direction.

5. In combination as claimed in claim 1 with said first funnel-shaped member being resilient.

References Cited

UNITED STATES PATENTS

| | | | |
|---|---|---|---|
| 1,095,430 | 5/1914 | Spicer | 64—32 XR |
| 2,008,830 | 7/1935 | Johnson | 64—32 |
| 3,053,062 | 9/1962 | Geisthoff | 64—4 |

FOREIGN PATENTS

| | | |
|---|---|---|
| 178,632 | 3/1962 | Sweden. |

JAMES A. WONG, Primary Examiner